Patented Dec. 8, 1953

2,662,027

UNITED STATES PATENT OFFICE 2,662,027

POLYCHROMATIC COATING COMPOSITIONS

Ralph E. Pike, Rose Valley, Pa., assignor to E. I. du Pont de Nemours & Company, Wilmington, Del., a corporation of Delaware No Drawing. Application March 13, 1951, Serial No. 215,393

7 Claims. (Cl. 106—193)

This invention relates to lacquers and synthetic enamels and particularly to such coating compositions which possess a translucent metallic or polychromatic appearance.

In the past few years, coating compositions which have a desirable "depth," luster, and transparent metallic appearance, have been very popular, particularly as automobile finishes. In this case depth does not mean intensity as in the term "deep color"; rather, it means the optical illusion of distance or thickness characteristic of polychromatic metallic finishes. This metallic appearance is difficult to describe, but it might be regarded as the optical sensation resulting from the multi-color effect produced by a somewhat translucent coating composition partly by the light reflected from the surface, and partly by the light transmitted by the translucent film and ultimately reflected by aluminum flakes in the film.

A coating composition described as being metallic in appearance possesses the following characteristics, to some degree, simultaneously: (1) an appearance of depth or distance in the film, (2) an ability to change color depending on the angle of view and the nature and direction of the illuminating source, (3) the ability to highlight, or attract attention to, changes in contour of the finished article (for instance, body design of automobiles), and (4) a multi-color or polychromatic effect on flat surfaces. The "two-tone" of a polychromatic finish is largely the effect of characteristic (2) above. To the eye, two-tone is the difference between the relative darkness of the coating when viewed at one angle and its relative lightness from another angle. Two-tone contributes to characteristic (3) above because of the different angles involved in viewing irregularly curved surfaces. A polychromatic finish possesses the so-called metallic appearance to a much greater extent when viewed under intense illumination such as direct sunlight. Therefore, it is desirable to use strong illumination when comparing different metallic enamels.

Although the pigments and vehicles used in metallic or polychromatic finishes all contribute to the metallic appearance, aluminum flake pigment is the essential ingredient in all of these finishes because it provides the embedded mirror surfaces which reflect part of the light transmitted to them.

In the past, aluminum flake pigment has been available, as dry powder or as a paste in a volatile organic solvent (e. g. mineral spirits), in many grades for use in coating compositions. The grades are known commercially as, for instance, "Extra Fine Lining Paste," "Standard Aluminum Paste" and "Extra Brilliant Varnish Powder." They are usually available as leafing or non-leafing types. Each of these grades is made independently by stamping or milling suitable aluminum metal under controlled conditions, removing the oversized particles, and collecting the remainder as a commercial grade possessing a characteristic particle size distribution, as disclosed in the book "Aluminum Paint and Powder" by Junius David Edwards, 2nd. edition, copyright 1936, Reinhold Publishing Co. The individual particles in such a commercial grade, therefore, vary in size from the minute, dusty "fines" up to a size large enough to be removed by the separating process. The polychromatic enamel industry has used in the past relatively fine aluminum flake pigments which are graded or classified only to the extent of removing substantially all of the objectionable large flakes—larger than about 325 mesh. The presence of a substantial number of particles as large as 325 mesh (ASTM specification E11–39 for Sieves; about 44 microns in largest dimension), is known to cause a "seedy" or gritty enamel and to render it unsatisfactory for coating articles subject to critical examination, such as automobile bodies.

Certain grades of this relatively fine aluminum pigment are preferable to others in making metallic or polychromatic finishes. The desired degree of brightness, two-tone, or metallic appearance in an otherwise constant formula is obtained by selecting a grade of aluminum flake pigment or paste with a suitable balance between tinting strength and brightness or reflective power. Other properties being equal, very fine grades of aluminum flake generally possess relatively high tinting strength but low brightness; that is, they impart a gray or "milky" appearance and relatively little brightness to the finished enamel. The brightness of the finished enamel therefore cannot be increased by adding more of the aluminum pigment without simultaneously increasing the undesirable milky or gray effect which destroys the clean, clear basic color of the metallic enamel. Even though the relatively coarser grades of fine aluminum pigment, which are suitable for metallic enamels and which contain substantially no particles large enough to cause a rough seedy film, impart improved brightness to the finished product; the undesirable milky appearance is present to some extent.

It has been a goal of the organic enamel industry to produce a metallic or polychromatic finish which is simultaneously clean and bright rather than relatively dull and milky; that is, a metallic finish which employs only the desirable characteristics of the best aluminum flake pigments—high reflective power, smoothness, and a reasonable tinting strength—without the disadvantages of roughness, milkiness, and a tinting strength so high that it makes the final product relatively dull and opaque.

It is an object of this invention to provide polychromatic metallic coating compositions which are cleaner, brighter, and higher in gloss than known finishes using the same amount of conventional aluminum flake pigment. It is another object to provide polychromatic finishes with improved two-tone and polychromatic or metallic appearance.

These objects are accomplished by incorporating into an organic coating composition, which is otherwise suitable as a base for a metallic finish, a predetermined quantity of a special aluminum flake pigment or paste which is fully described hereinafter.

An ideal aluminum flake pigment for use in this invention would be one in which none of the aluminum flakes has a maximum dimension less than 5 microns (0.005 millimeter or about 0.0002") or more than 25 microns. However, it is recognized that a commercially practical and economical separating process must permit a reasonable latitude, particularly at the fine end of the range. Due to this commercial limitation alone, it is necessary to define the aluminum flake pigment which most nearly approximates the ideal as one in which (1) not more than 5% of the total covering area of all of the flakes is contributed by flakes having a maximum dimension greater than 25 microns and (2) not more than 20% of the total covering area of all of the flakes is contributed by flakes having a maximum dimension less than 5 microns. Particle size may be determined by actual measurements on photomicrographs of known magnification or by measurement in a scaled or graduated field under magnification. A screen or sieve analysis based on a mechanical separation of the components of the preferred aluminum pigment is impractical because of the extremely small particle size, the low specific gravity of aluminum and the aggregative nature of the flakes. The finest screen or sieve included in ASTM specification E11–39 is No. 400 (37 microns).

A further requirement of the novel aluminum flake pigment used in this invention is that it must have a covering area between 14,500 and 17,000 square centimeters per gram as determined by the covering area test described in "Aluminum Paint and Powder" by Junius David Edwards. A fine aluminum pigment classified this closely has not been available prior to the conception of this invention. Small laboratory-made samples and semi-works batches (on the order of 10 lbs. in size) have only recently been prepared, at my request, by domestic industrial organizations whose usual business includes the manufacture of conventional aluminum pigments and pastes by the processes previously referred to. Because no demand existed for the special aluminum flake used in this invention, and also because the extremely fine particles do not respond to separation or segregation from slightly coarser particles by commercially economical screening or sieving processes; fine aluminum pigments which have been further processed to remove more of the coarse and fine flakes have not been available for use in polychromatic coating compositions.

The special aluminum flake pigments or pastes used in this invention can be made most conveniently by subjecting mixtures of various particle size non-leafing or deleafed aluminum flakes to a liquid floatation type classifying process and segregating that portion having the particle size distribution and covering area specified in the paragraph immediately above.

Coating compositions suitable for use as bases or starting materials for metallic finishes are known to those skilled in the art. The improvements of this invention are most pronounced in the new type compositions disclosed in my co-pending application Serial No. 51,883 filed September 30, 1948. However, the improvements are also obtained in conventional and well known polychromatic coating compositions. References to colored compositions which ar suitable as bases for preparing polychromatic finishes by the addition of aluminum flake pigment include the U. S. Patents Nos. 2,302,305, 2,335,760, 2,343,925, 2,384,579 and 2,493,020.

The improvements of this invention are demonstrated by the following examples which are given by way of illustration only. It is to be understood in these examples that each colored pigment was in the form of a finely divided suspension in an organic vehicle, the suspension having been prepared by any suitable means employed in the coating composition art, particularly by a ball-, pebble-, roller-, or buhrstone- mill or in some cases by the processes of U. S. Patent Nos. 2,140,745 or 2,384,579. All of the aluminum flake pigments were in the form of pastes in a volatile hydrocarbon. The presence of hydrocarbon forms no part of the invention and it was used largely for convenience in handling. The particle size distributions (or particle size analyses) of several commercial aluminum flake pigments which are commonly used in metallic enamels, plus several which are specially prepared for use in this invention, are shown in Table I. Also shown in this table are the two-tone and grayness (milky appearance) ratings of the polychromatic enamels made by using these various grades of aluminum flake pigment in the following gray metallic enamel:

EXAMPLE I

| | Parts by weight |
|---|---|
| Pigment: | |
| Monastral Fast Green Toner G (Phthalocyanine green) | 4.57 |
| Resinated lake of dichloroisobenzanthrone | 3.50 |
| Hydrous iron oxide | 19.50 |
| Aluminum flake pigment (dry) | 7.30 |
| Vehicle: | |
| 49% linseed oil—China-wood oil glyceryl phthalate resin (solid) | 263.00 |
| 52% linseed oil glyceryl phthalate resin (solid) | 29.00 |
| 50% soya oil—China-wood oil pentaerythritol phthalate resin (solid) | 70.80 |
| 33% China-wood oil phenol formaldehyde oleoresinous varnish (solid) | 4.20 |
| Drier solution (3% manganese) | 4.60 |
| Butanol modified urea-formaldehyde resin (solid) | 10.60 |
| Butanol | 7.10 |
| Hydrocarbon solvent | 638.00 |
| | 1,062.37 |

Six enamels were prepared using this formula, and they differed only in the grade of aluminum flake pigment used.

The various enamels based upon this formula were thinned to spraying viscosity with volatile solvent, applied to 4″ x 12″ metal panels, baked for 1 hour at 225° C., and tested to determine the two-tone and grayness values shown in Table I.

The two-tone ratings were based on a system of giving the most two-tone a rating of 10 and no two-tone a rating of zero.

The grayness ratings were based on a value of 10 for the grayest (milkiest) effect and a value of zero for no adverse graying effect.

The gloss values were determined by the method described in "The Measurement of the Gloss of Paint Panels," S. C. Horning and M. P. Morse: Official Digest—Federation of Paint and Varnish Production Clubs, March 1947, p. 153. The enamel having the highest gloss is represented by the highest numerical gloss value and vice versa. Since seed, grit, or roughness tend to lower the apparent gloss of an otherwise smooth and glossy enamel film, the gloss measurements in this case were a measure of the extent to which the respective aluminum flake pigments contributed seed, grit, or roughness to the enamel.

Table I
PROPERTIES OF ALUMINUM FLAKE PIGMENTS IN POLYCHROMATIC ENAMELS

| Aluminum flake—Pigment number and grade | 1 Commercial grade | 2 Commercial grade | 3 Special grade | 4 Special grade | 5 Special grade | 6 Special grade |
|---|---|---|---|---|---|---|
| Particle size (microns) [1]: | | | | | | |
| 0–5 | 13.9 | 23.4 | 15.1 | 8.0 | 9.9 | 8.7 |
| 5–10 | 58.5 | 44.8 | 46.2 | 37.4 | 40.9 | 44.9 |
| 10–15 | 15.4 | 19.6 | 24.6 | 23.2 | 22.3 | 24.0 |
| 15–20 | 5.0 | 4.0 | 6.9 | 19.1 | 12.8 | 12.3 |
| 20–25 | 4.1 | 3.3 | 2.9 | 12.3 | 14.1 | 10.1 |
| 25–30 | 3.1 | 4.9 | 4.3 | 0.0 | 0.0 | 0.0 |
| 30–40 | 0.0 | 0.0 | 0.0 | 0.0 | 0.0 | 0.0 |
| Covering area—Square centimeters per gram of dry flakes | 27,000 | 14,000 | 16,800 | 14,550 | 16,050 | 17,640 |
| Two-tone rating | 2 | 7 | 8 | 10 | 9 | 4 |
| Grayness rating | 10 | 6 | 6 | 5 | 6 | 9 |
| Gloss value | 82 | 68 | 74 | 82 | 85 | 86 |

[1] Analysis is based upon the percentage of the total surface area of the flakes of the given sample which is contributed by flakes having a maximum dimension within the ranges shown.

From Table I it is seen that aluminum pigment No. 4 has the best two-tone rating and also the best grayness rating, accompanied by high gloss, which combination yields a maximum metallic effect. Similarly, aluminum pigment No. 3 and No. 5 possess a markedly better combination of two-tone, high gloss, and freedom from grayness than aluminum pigments No. 1, No. 2, and No. 6.

The results obtained with aluminum pigments No. 1 and No. 6 also indicate that the particle size distribution alone is not responsible for the improvement claimed in this invention since these two aluminum pigments have the proper particle size distribution but an unsuitable covering area. Furthermore, the failure of aluminum pigment No. 2 to produce the claimed improvements is shown to be attributable to too low a covering area or too high a content of fines in the 0–5 micron range, or a combination of these characteristics. It is therefore obvious that a suitable aluminum flake pigment for use in this invention must have a covering area of the order of 14,500–17,000 square centimeters per gram of dry flake and not more than 20% of said area may be contributed by flakes in the 0–5 micron range and not more than 5% by flakes larger than 25 microns.

With further reference to flake size distribution, the suitable aluminum flake pigments also may be characterized as being within the following limits:

Table II

| Maximum dimension of flake (microns) | Percentage of total covering area of all the flakes |
|---|---|
| 0–5 | 0–20 |
| 5–10 | 35–50 |
| 10–15 | 20–25 |
| 15–20 | 5–20 |
| 20–25 | 2–15 |
| >25 | 0–5 |

In Example I the concentration of aluminum flake pigment is about 21% by weight of the total pigment content. The invention is not limited to this specific concentration, and any proportion of aluminum up to the order of 90% of the total pigment, depending upon the nature of the colored pigment present, produces polychromatic coating compositions within the scope of this invention. However, the preferred aluminum concentration for the most striking improvement is between 5% and 50% by weight of the total pigment content.

This invention is not limited to the colored pigments shown in Example I, and any suitable combination of white or colored pigments commonly used in polychromatic organic coating compositions can be substituted for those shown. The following is a partial typical list of other suitable pigments.

Titanium dioxide
Monastral Blue Toner BX—phthalocyanine blue
Iron blues
Arylide maroon dark
Thioindigoid vat dyestuff—"Indo" maroon
Chromium tetrahydrate
Lead chromates
Toluidene toners
"Lithosol" Yellow 3GD—nickel complex of an azo dye
Carbon blacks
Ferrite yellow
Red iron oxides
"Ponsol" blue lake—Indanthrone blue This invention is not limited to the organic resins shown in Example I, and any suitable liquid organic film-forming material, as an individual substance or a blend of more than one, may be substituted for the combination of urea-formaldehyde, alkyd, phenolic, and vegetable oil film-forming materials shown. The following is a partial list of other suitable liquid organic film-forming materials:

Non-drying Oil modified alkyd resins (polybasic acid/polyhydric alcohol condensates)
Cellulose nitrate (nitrocellulose)
Vinyl chloride or vinyl acetate polymers and copolymers
Polymeric esters of acrylic or methacrylic and an alkanol containing up to 6 carbon atoms
Vegetable oils; raw, bodied, blown
Monohydric alcohol modified amino aldehyde resins
Natural resins
Epoxide polymers.

It is to be understood that the film-formers are usually in the form of solutions or suspensions in conventional liquids such as esters, ketones, alcohols, ethers, hydrocarbons and the like. Also film-formers are normally modified with one or more of the following: catalysts, driers, inhibitors, plasticizers, diluents and the like. The composition of the vehicle (film-former plus modifiers) may be altered to make the resulting coating composition dry by evaporation, by simple air drying or by baking.

The above mentioned colored pigments, film-formers, solvents, and modifiers per se and combinations thereof form no part of the invention. This invention is an improvement derived from the incorporation of special aluminum flake pigment into well known combinations of such colored pigments, film-formers, solvents and modifiers.

The products of this invention are useful in coating any article on which a metallic or polychromatic finish is desired. The principal use for such enamels or lacquers is on automobile bodies.

It is apparent that many widely different embodiments of this invention can be made without departing from the spirit or scope thereof, and it is not intended to be limited except as indicated in the appended claims.

I claim:

1. A polychromatic coating composition comprising an organic film-forming material, a colored pigment, and an aluminum flake pigment, said aluminum flake pigment constituting not more than 90% of the total pigment and having a covering area between 14,500 and 17,000 square centimeters per gram of flakes, not more than 20% of said covering area being contributed by flakes having a maximum dimension less than 5 microns and not more than 5% of said covering area being contributed by flakes having a maximum dimension greater than 25 microns.

2. A coating composition of claim 1 in which the organic film-forming material is a vegetable oil modified alkyd resin.

3. A coating composition of claim 1 in which the organic film-forming material is cellulose nitrate.

4. A coating composition of claim 1 in which the organic film-forming material is a monohydric alcohol modified amino-aldehyde resin.

5. A coating composition of claim 1 in which the organic film-forming material is a vinyl ester polymer.

6. A coating composition of claim 1 in which the organic film-forming material is a polymeric ester of a saturated aliphatic alcohol containing no more than 6 carbon atoms and an acrylic acid.

7. A polychromtaic coating composition comprising an organic film-forming material, a colored pigment, and an aluminum flake pigment, said aluminum flake pigment constituting not more than 90% of the total pigment and having a covering area between 14,500 and 17,000 square centimeters per gram of flakes and having a flake size distribution within the ranges of Table II of the specification.

RALPH E. PIKE.

References Cited in the file of this patent

UNITED STATES PATENTS

| Number | Name | Date |
|---|---|---|
| 2,178,018 | Hofmann | Oct. 31, 1939 |
| 2,326,623 | Crosby | Aug. 10, 1943 |

OTHER REFERENCES

Wray Official Digest pages 441–446 (1948).